(Model.) 2 Sheets—Sheet 1.
B. M. SOULE.
RUNNING GEAR FOR VEHICLES.
No. 261,269. Patented July 18, 1882.
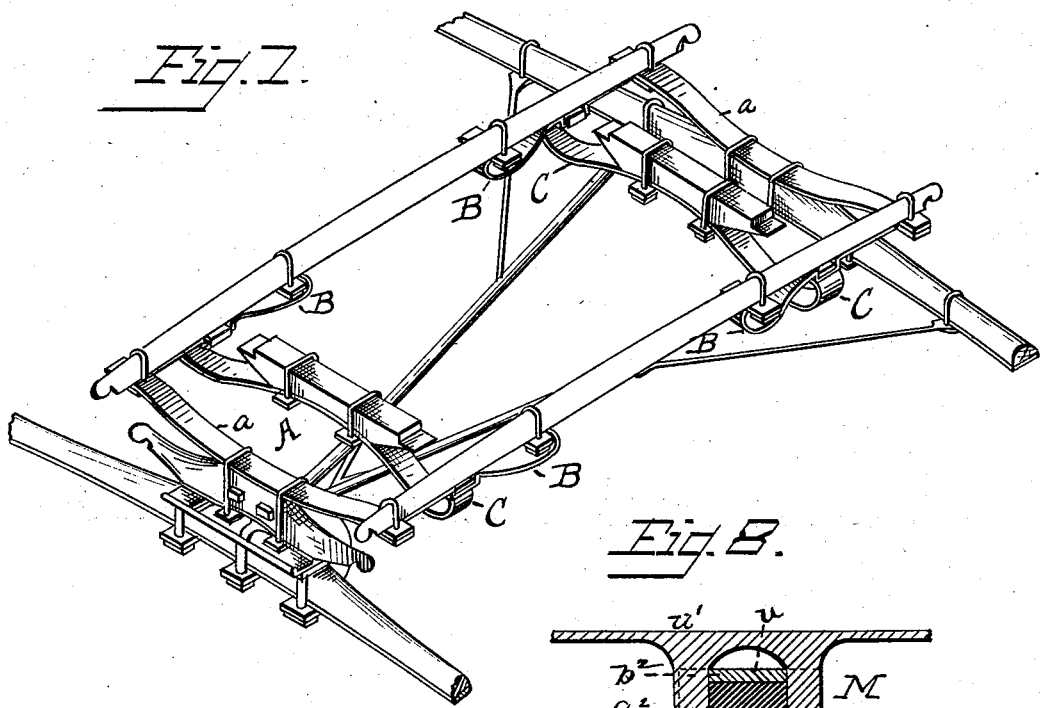
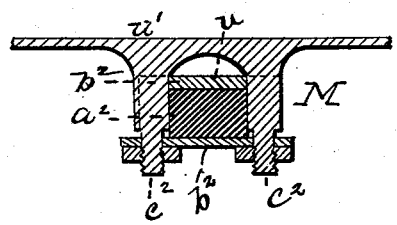
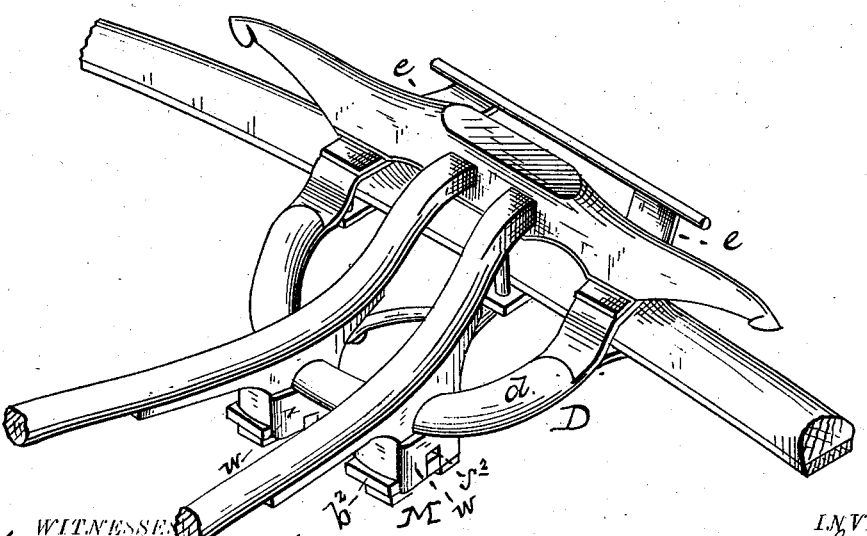
WITNESSES
Franck L. Durand
Geo. U. Rose Jr.
INVENTOR
B. M. Soule
by Heylmunt Kauz
Attorneys.

(Model.) 2 Sheets—Sheet 2.

B. M. SOULE.
RUNNING GEAR FOR VEHICLES.

No. 261,269. Patented July 18, 1882.

WITNESSES
Franck L. Ourand
Geo. E. Rose Jr.

INVENTOR
B. M. Soule
by Hrylmunt Kauz
Attorneys.

UNITED STATES PATENT OFFICE.

BUREN M. SOULE, OF CEDAR RAPIDS, IOWA.

RUNNING-GEAR FOR VEHICLES.

SPECIFICATION forming part of Letters Patent No. 261,269, dated July 18, 1882.

Application filed May 2, 1882. (Model.)

*To all whom it may concern:*

Be it known that I, BUREN M. SOULE, a citizen of the United States of America, residing at Cedar Rapids, in the county of Linn and State of Iowa, have invented certain new and useful Improvements in Running-Gear for Buggies and Similar Vehicles; and I do hereby declare the following to be a full, clear, and exact description of the invention, such as will enable others skilled in the art to which it appertains to make and use the same.

This invention relates to improvements in the running-gear of buggies and similar vehicles, and is designed as improvements on the devices shown and described in Letters Patent granted to me October 18, 1881, and numbered 248,361.

My improvements therefore consist in a horizontal spring formed with extensions at both ends and scrolled at one end, and having midway between the ends a formed recess, as hereinafter set forth.

My improvements further consist in a transverse curved or semi-elliptical spring having the ends scrolled and lapped or struck square, and formed to fit over and in the formed recess of the horizontal springs.

My improvements further consist in the novel construction of a clip king-bolt, in combination with a tension-spring and recessed bolt, as will be hereinafter set forth.

My improvements further consist in the novel construction and arrangement of means for preventing the fifth-wheel from rattling.

My improvements also consist in the novel construction and combination of parts, as will be hereinafter more fully set forth.

Figure 3:
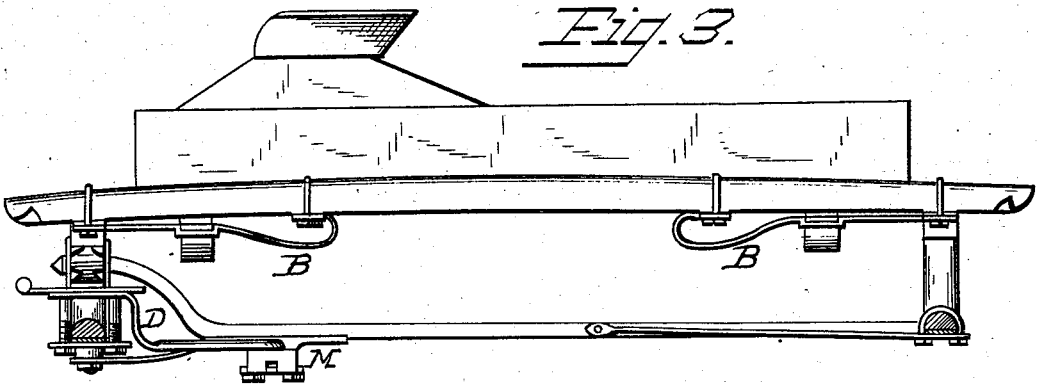
Figure 4:
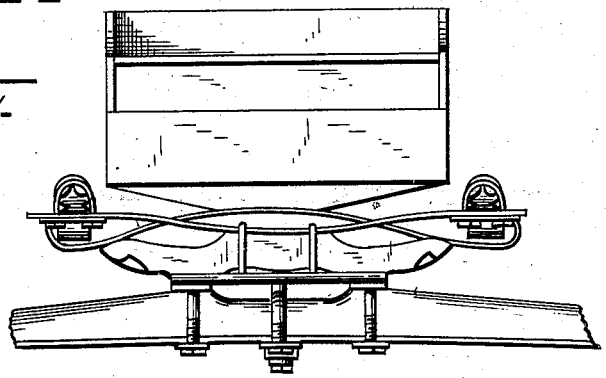
Figure 5:
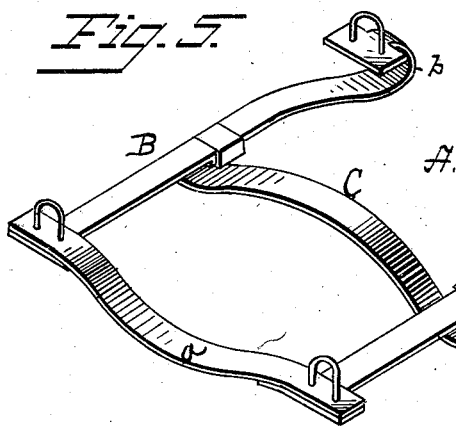
Figure 6:
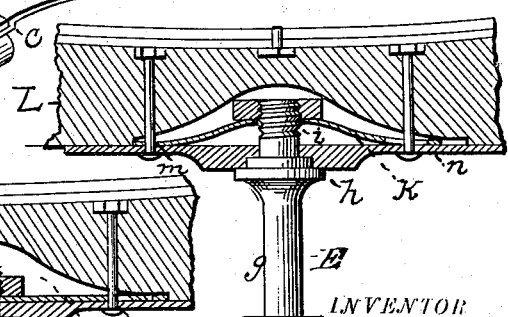
Figure 7:
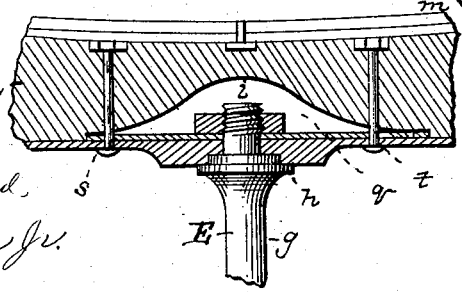

In the accompanying drawings, making a part of this specification, Figure 1 is a perspective view of my improvements attached to the axles of a vehicle. Fig. 2 is a perspective view of the fifth-wheel. Fig. 3 is a side view, showing the body of a vehicle attached. Fig. 4 is an end view of the same. Fig. 5 is a perspective view of my improved spring. Fig. 6 is a transverse central sectional view of the bolster of a vehicle, showing my improved clip king-bolt inserted before being made fast; and Fig. 7 is a transverse central sectional view of the same, showing the clip king-bolt screwed and secured in place; and Fig. 8 is a longitudinal sectional view of the fifth-wheel anti-rattler.

The letter A (see Figs. 1 and 5) represents my improved spring-frame, wherein the end spring $a$ consists of a common semi-elliptical vehicle-spring provided at its ends with suitable perforations for receiving clips.

The letter B represents my improved horizontal springs formed with T-shaped ends, provided with clip-holes, and having the ends $b$ scrolled substantially as shown in the drawings, and also formed with a centrally-located recess, $c$, for the purpose of receiving the attached spring, as hereinafter set forth.

The letter C represents a transverse spring, curved or semi-elliptical in general conformation, but having the ends scrolled and then the extensions bent back flat and outwardly over the scroll for the purpose of fitting over the horizontal springs in the recesses $c$, where it is secured and maintained by the clips of the spring-frame over the side bars of the vehicle. In constructing and connecting these spring-plates together the horizontal springs are run under the ends of the end semi-elliptical spring, and the same clips secure them to the side bars at this point. The scrolled ends of the horizontal springs are secured to the side bars by clips, as seen in the drawings. The end semi-elliptical spring and the horizontal springs running parallel to the side bars being thus secured with the transverse spring resting in the centrally-located recesses of the side springs, it will be readily seen that the spring on which the body rests and is secured obtains a direct vertical motion. Further, by securing the end of the horizontal springs to the side bars and making the end scrolled it will shorten and lengthen, and the bearing will be equally disposed at both ends. By the construction of the spring C it fits on the horizontal springs on the inside instead of the outside, and is secured thereto by bolts.

The letter D represents my improved fifth-wheel attached to the front axle. This fifth-wheel consists of a semicircular plate, $d$, which is formed with a horizontal extension, $e$, extending over the axle and secured thereto by clips, with the intermediate portions back of the axle bent at an angle and extended downward to a point even with the under side of the reach in order to bring the fifth-wheel on a line directly with the under face of the reach, where it passes through a loop or loops secured by any suitable means, but in this case through openings of anti-rattlers.

The letter E (see Figs. 6 and 7) represents my improved clip king-bolt, formed with the clip-bolts $g$ for straddling the axle, the shoulders $h$, and the screw-threaded bolt $i$.

The letter K represents a spring having a central perforation fitting over the screw-threaded portion of the king-bolt, and formed at one end with a perforation, $m$, and at the other with an elongated slot, $n$.

The letter L represents the front bolster of the vehicle, having the central part, $q$, cut out substantially as seen in the drawings. The king-bolt is passed through the bolster-plate and then through the steel spring, the screw-threaded portion being only left long enough to pass through the bolster-plate and through the spring, after which the nut is put on and screwed down until the spring is pressed down flat, or nearly so, on the bolster-plate, as seen in Fig. 7, and in order that the nut may not become loose the end of the bolt is riveted down. The spring K is let into the bolster, so it can play up as the king-bolt and plate wear, and one end of the spring is rigidly secured by a bolt, $s$, passed through the bolster and plate. The other end of the spring is formed with a slot, allowing it to play sufficiently to press against the nut, and a bolt, $t$, similar to that securing the other end, is passed through the bolster and plate and secured by a nut screwed on the end of the bolt. It will be observed by this arrangement and construction of the king-bolt and attachments rattling of the parts is obviated, because as the bolt and the plate wear away the pressure of the spring will keep the bolt tight until entirely worn out, and that the action of the spring tends to prevent sudden jars on the bolt from breaking it. The bolts $s$ and $t$ add to the strength of the bolster, and at the same time act as stays to the steel spring.

The letter M (see Figs. 2 and 8) represents my improved fifth-wheel anti-rattler, consisting of the plate $u'$, open case $w$, elastic cushion $a^2$, and cap-plate $b^2$. The plate $u'$ is formed or provided with transverse depending walls terminating in screw-bolts $c^2$, or equivalents, and between the depending walls this plate is arched for the purpose of receiving the bar of the fifth-wheel, which is made of half-round material; but it is obvious that other shaped arch and iron may be used. The depending walls of this plate are also formed narrower than the plate, in order that shoulders may be formed, against which the open case abuts. The open case $w$ is formed with top plate, $u$, and side walls, connected by an intermediate piece, and fits over the sides of and in the space between the depending walls of the plate $u$. This open case $w$ has formed in each of its side walls a slot, $f^2$, in which corresponding ears of the cap-plate fit. The cap-plate $b^2$ is formed with side ears and perforations, corresponding respectively to the slots in the open case and screw-bolts of the depending walls of the plate. The elastic cushion is preferably made of hard rubber, and fits in the chamber formed by the depending walls of the plate $u'$ and side walls of the open case $w$. The plate $u'$ is secured to the reach or reaches of the vehicle by any suitable means, and adjusted thereon to conform to the course of the bar of the fifth-wheel. After the plate is secured and a bar of the fifth-wheel adjusted therein the open case, with the elastic cushion, is put in position, the cap-plate fitted over the bolts and screwed home, when the device is complete.

It will be observed by the foregoing description that as the bar of the fifth-wheel wears away by use the case containing the elastic cushion is constantly pressed up against the bar and all rattling from that source stopped.

I reserve the right to vary the construction and arrangement of the parts without departing from the spirit of the invention.

What I claim as my invention, and desire to secure by Letters Patent, is—

1. A horizontal spring for a vehicle, formed with end side extensions for the passage of clip-bolts and scrolled or curved at one end, substantially as described.

2. A horizontal spring for a vehicle, formed with end side extensions for the passage of clip-bolts, scrolled or curved at one end, and having midway between the ends a formed recess, substantially as described.

3. In a vehicle, the combination of horizontal springs formed with the side extensions for the passage of the clip-bolts, scrolled at one end and formed with a recess, and a transverse curved or semi-elliptical spring having the ends scrolled and folded over to fit in the formed recess of the horizontal springs, substantially as described.

4. In a vehicle, the combination, with a king-bolt, of a tension-spring arranged within the bolster for taking up the wear of the king-bolt, substantially as described.

5. The combination, with a reach or reaches of a vehicle and a fifth-wheel, of an anti-rattler, substantially as described.

6. The combination, with a bolster having a formed recess or chamber, of a king-bolt with its screw-threaded portion $i$ arranged within the chamber of the bolster, and spring K, passed over the screw-threaded portion $i$ with nut, substantially as described.

7. The combination and arrangement of bolster having a central formed recess, a king-bolt with screw-threads $i$, spring K, formed with slot $n$, and bolts $s$ $t$, substantially as described.

In testimony whereof I affix my signature in presence of two witnesses.

BUREN M. SOULE.

Witnesses:
I. N. WHITTAM,
ZELIFF TAYLOR.